(12) United States Patent
Ji et al.

(10) Patent No.: US 9,699,300 B2
(45) Date of Patent: Jul. 4, 2017

(54) PORTABLE ELECTRONIC APPARATUS, METHOD OF OPERATING PORTABLE ELECTRONIC APPARATUS (71) Applicant: Lenovo (Beijing) Co., Ltd., Beijing (CN)

(72) Inventors: Zhengqiao Ji, Beijing (CN); Chuanfeng Wang, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 0 days.

(21) Appl. No.: 14/618,056

(22) Filed: Feb. 10, 2015

(65) Prior Publication Data
US 2016/0057277 A1 Feb. 25, 2016

(30) Foreign Application Priority Data

Aug. 25, 2014 (CN) .......................... 2014 1 0423044

(51) Int. Cl.
H04M 1/725 (2006.01)
H04M 19/04 (2006.01)
(52) U.S. Cl.
CPC ..... H04M 1/72569 (2013.01); H04M 19/047 (2013.01)
(58) Field of Classification Search
None
See application file for complete search history.

(56) References Cited

U.S. PATENT DOCUMENTS

| 7,019,622 | B2* | 3/2006 | Orr | ......................... G08B 6/00 340/407.1 |
| 7,469,155 | B2* | 12/2008 | Chu | ................... H04M 1/72569 455/456.1 |
| 7,769,353 | B2* | 8/2010 | Dietrich | .............. H04M 1/0202 455/550.1 |
| 8,184,423 | B2* | 5/2012 | Rothkopf | .............. G06F 1/1626 361/173 |
| 8,478,354 | B2* | 7/2013 | Miwa | ...................... H04M 9/04 455/412.1 |
| 8,487,759 | B2* | 7/2013 | Hill | ................... H04M 1/72563 340/506 |

(Continued)

FOREIGN PATENT DOCUMENTS

| CN | 101345958 | 1/2009 |
| CN | 101399861 | 4/2009 |

(Continued)

OTHER PUBLICATIONS

Fischer, Dirk, "Capacitive Touch Sensors" Capacitive Sensors (2009), pp. 1-12.*

(Continued)

*Primary Examiner* — Kimberly A Williams
(74) *Attorney, Agent, or Firm* — Brinks Gilson & Lione; G. Peter Nichols (57) ABSTRACT

A method of operating a portable electronic apparatus, a portable electronic apparatus, and a computer readable storage medium are described. The method includes detecting a motion amplitude of the portable electronic apparatus and vibrating the portable electronic apparatus by a vibrating amplitude that is based upon the detected motion amplitude of the portable electronic apparatus.

17 Claims, 2 Drawing Sheets

(56) References Cited

U.S. PATENT DOCUMENTS

| | | | | |
|---|---|---|---|---|
| 8,860,562 B2* | 10/2014 | Hill | | H04M 1/72563 340/10.2 |
| 8,938,210 B1* | 1/2015 | Otto | | H04W 4/22 455/404.1 |
| 2002/0010008 A1* | 1/2002 | Bork | | H04M 19/041 455/567 |
| 2002/0068537 A1* | 6/2002 | Shim | | H04M 1/605 455/177.1 |
| 2004/0127198 A1* | 7/2004 | Roskind | | H04M 1/72566 455/412.2 |
| 2005/0064913 A1* | 3/2005 | Kim | | H04M 19/041 455/567 |
| 2007/0099574 A1* | 5/2007 | Wang | | H04M 1/72569 455/67.11 |
| 2008/0036591 A1* | 2/2008 | Ray | | H04M 1/72569 340/540 |
| 2008/0165116 A1* | 7/2008 | Herz | | G09G 3/3406 345/102 |
| 2008/0167006 A1* | 7/2008 | Hsi | | H04M 19/044 455/412.2 |
| 2009/0003620 A1* | 1/2009 | McKillop | | G06F 3/165 381/80 |
| 2011/0077055 A1* | 3/2011 | Pakula | | H04M 19/04 455/567 |
| 2011/0148330 A1* | 6/2011 | Zhou | | H04M 1/72522 318/114 |
| 2012/0274218 A1* | 11/2012 | Mountain | | H04M 1/22 315/152 |
| 2013/0288655 A1* | 10/2013 | Foruntanpour | | H04M 1/6008 455/418 |
| 2013/0335217 A1* | 12/2013 | Pakula | | H04M 19/04 340/517 |
| 2014/0349632 A1* | 11/2014 | Chan | | H04W 8/22 455/418 |
| 2015/0160728 A1* | 6/2015 | Yagi | | H04M 1/72569 345/156 |
| 2015/0271647 A1* | 9/2015 | Megarity | | H04W 4/04 455/456.1 |

FOREIGN PATENT DOCUMENTS

| | | |
|---|---|---|
| CN | 201409154 Y | 2/2010 |
| CN | 102055827 | 5/2011 |
| CN | 102957790 A | 3/2013 |
| CN | 103945035 | 7/2014 |

OTHER PUBLICATIONS

First Office Action dated Oct. 29, 2015 out of Chinese priority Application No. 201410423044.5 (13 pages).

Third Office Action dated Nov. 21, 2016 out of Chinese priority application 201410423044.5 with English translation (10 pages).

* cited by examiner

PORTABLE ELECTRONIC APPARATUS, METHOD OF OPERATING PORTABLE ELECTRONIC APPARATUS

BACKGROUND

This application claims priority to Chinese Patent Application No. 201410423044.5 filed on Aug. 25, 2014, the entire contents of which are incorporated herein by reference.

The present disclosure relates to a field of computer technology, in particular to a method of operating a portable electronic apparatus, a portable electronic apparatus, and a computer readable storage medium.

With the continuous development of science and technology, electronic technology has been developed rapidly, there are a growing number of electronic products, and people already enjoy every facility brought about by the development of science and technology. At present, people can enjoy a comfortable life brought about by the development of science and technology through a variety of types of electronic apparatus. For example, an electronic apparatus such as a mobile phone and the like has become an essential part in people's everyday life. People can utilize the electronic apparatus such as the mobile phone and the like to strengthen their contact with others by means of calling and sending messages and so on.

Now, the mobile phone has almost become a must-have electronic product for everybody. In general, when there is a call or a short message, the mobile phone will ring so as to prompt a user. When being out of doors, the user may not hear ringtones due to much noise in the outdoor environment. As a result, many users will adjust the mobile phone from a ring mode into a vibration mode. The user always puts the mobile phone inside a pocket of a cloth or trousers, so that the user is able to sense the mobile phone when it vibrates.

However, in the case that the user is in a motion state, for example, when the user is walking or running and the mobile phone vibrates, the user may fail to sense the vibration because the user himself/herself can also be regarded as being in a state of vibration and at this time the mobile phone cannot further prompt the user, which may result in the user's miss of a call or a short message and so on.

Thus, the mobile phone in the prior art has a technical problem of the prompting effect being not strong.

SUMMARY

In embodiments of the present disclosure, there are provided a method of operating a portable electronic apparatus, a portable electronic apparatus, and a computer readable storage medium capable of solving a technical problem in the prior art that the electronic apparatus does not have a strong prompting effect.

According to one aspect of embodiments of the present disclosure, there is provided method of operating a portable electronic apparatus, comprising: detecting a motion amplitude of the portable electronic apparatus; and vibrating the portable electronic apparatus by a vibrating amplitude that is based upon the detected motion amplitude of the portable electronic apparatus.

As an example, the detecting the motion amplitude of the portable electronic device comprises: determining whether or not an environmental light brightness value of an environment in which the portable electronic apparatus is located is lower than a preset brightness value; and detecting the motion amplitude of the portable electronic device if the environmental light brightness value is lower than the preset brightness value.

As an example, the determining whether or not an environmental light brightness value of an environment in which the electronic apparatus is located is lower than a preset brightness value comprises: collecting environmental light information through a light sensor; and judging whether or not an environmental light intensity corresponding to the environmental light information is smaller than a light intensity threshold; wherein it is determined that the environmental light brightness value of the environment in which the electronic apparatus is located is lower than the preset brightness value when the environmental light intensity is smaller than the light intensity threshold.

As another example, the determining whether or not an environmental light brightness value of an environment in which the portable electronic apparatus is located is lower than a preset brightness value comprises: collecting environmental light information through a light sensor and collecting a first distance between the portable electronic apparatus and an object adjacent to the portable electronic apparatus through a proximity sensor; determining that the environmental light brightness value of the environment in which the portable electronic apparatus is located is lower than the preset brightness value if the environmental light intensity is smaller than the light intensity threshold and the first distance is less than a preset distance.

As an example, the vibrating the portable electronic apparatus by a vibrating amplitude comprises: controlling a motor comprised in a vibrating module, in order to vibrate the vibrating module by the vibrating amplitude that is based upon the detected motion amplitude of the portable electronic apparatus.

As another example, the vibrating the portable electronic apparatus by a vibrating amplitude comprises: vibrating a vibrating module comprised within the portable electronic apparatus by a first vibration amplitude.

As an example, an acceleration sensor or a gyroscope is comprised in the portable electronic device to detect the motion amplitude of the portable electronic apparatus.

According to another aspect of embodiments of the present disclosure, there is provided a portable electronic apparatus, comprising: a vibrating module for vibrating the portable electronic apparatus; a detecting module configured to detect a motion amplitude of the portable electronic apparatus; and a controlling module configured to control the vibrating module in order to adjust a vibration amplitude of the vibrating module, based upon the motion amplitude of the portable electronic apparatus as detected by the detecting module.

As an example, the detecting module is configured to determine whether or not an environmental light brightness value of an environment in which the portable electronic apparatus is located is lower than a preset brightness value and detect the motion amplitude of the portable electronic device if the environmental light brightness value is lower than the preset brightness value.

As an example, the detecting module is configured to determine whether or not the environmental light brightness value of the environment in which the portable electronic apparatus is located is lower than the preset brightness value by: collecting environmental light information through a light sensor; and determining that the environmental light brightness value of the environment in which the portable electronic apparatus is located is lower than the preset brightness value if the environmental light intensity is smaller than a light intensity threshold.

As an example, the detecting module is configured to determine whether or not the environmental light brightness value of the environment in which the portable electronic apparatus is located is lower than the preset brightness value by: collecting environmental light information through a light sensor and collecting a first distance between the portable electronic apparatus and an object adjacent to the portable electronic apparatus through a proximity sensor; and determining that the environmental light brightness value of the environment in which the portable electronic apparatus is located is lower than the preset brightness value if the environmental light intensity is smaller than the light intensity threshold and the first distance is less than a preset distance.

As an example, the controlling module is configured to control a motor comprised in the vibrating module, so that the vibration amplitude of the vibration module is based upon the detected motion amplitude of the portable electronic apparatus.

As another example, the controlling module is configured to control the vibration amplitude of the vibrating module by a first vibration amplitude.

As an example, the detecting module is an acceleration sensor or a gyroscope.

According to another aspect of embodiments of the present disclosure, there is provided a computer readable storage medium upon which computer program instructions for performing the method of operating a portable electronic apparatus are recorded.

DETAILED DESCRIPTION

An information processing method in embodiments of the present disclosure can be applicable to an electronic apparatus that has at least a first sensing unit and can be carried by a carrier. The method comprises: detecting a motion amplitude of the carrier by using the first sensing unit; determining a first vibration amplitude based on the motion amplitude; and controlling a vibration amplitude of the electronic apparatus to be the first vibration amplitude.

In the embodiment of the present disclosure, the electronic apparatus can detect the motion amplitude of the carrier, so that the vibration amplitude of the electronic apparatus can be determined according to the motion amplitude of the carrier. In this way, it can be guaranteed as much as possible that in the case that the carrier is in motion with the motion amplitude, the vibration of the electronic apparatus with the first vibration amplitude can be sensed by the carrier, such that corresponding information can be received by the carrier. If the carrier is a user, then it can be guaranteed as much as possible that the user is able to receive the information in time so as to improve user experience. On the other hand, the electronic apparatus can determine the first vibration amplitude according to the motion amplitude of the carrier, thereby generating a relatively strong prompting effect for the carrier. As such, the prompting effect of the electronic apparatus is apparently increased, and the electronic apparatus is smarter.

In order to make the purpose, technical solutions and advantages of the embodiments in the present disclosure more clearly, the technical solutions in the embodiments of the present disclosure will be clearly and completely described in detail in combination with the accompanying figures in the embodiments of the present disclosure. Obviously, the embodiments described are merely part of embodiments of the present disclosure rather than all of the embodiments. Based on the embodiments of the present disclosure, all the other embodiments obtained by those skilled in the art without paying any inventive labor shall fall into the scope sought for protection in the present disclosure.

In the embodiment of the present disclosure, the electronic apparatus may be different electronic apparatuses such as a mobile phone, a PAD (tablet computer), a PC (personal computer), a smart television, a camera and so on, however the embodiments of the present disclosure are not so limited.

In addition, the term of "and/or" in the present disclosure is just an association relationship that describes an associated object, and indicates that there may be three relationships, for example, the expression of "A and/or B" can represent three situations of only A, both A and B, and only B. In addition, character "/" in the present disclosure generally represents an "or" relationship of between the associated objects before and after the character "/", unless otherwise specified.

Preferred implementations of the present disclosure will be described below in detail in combination with the figures.

Figure 1:
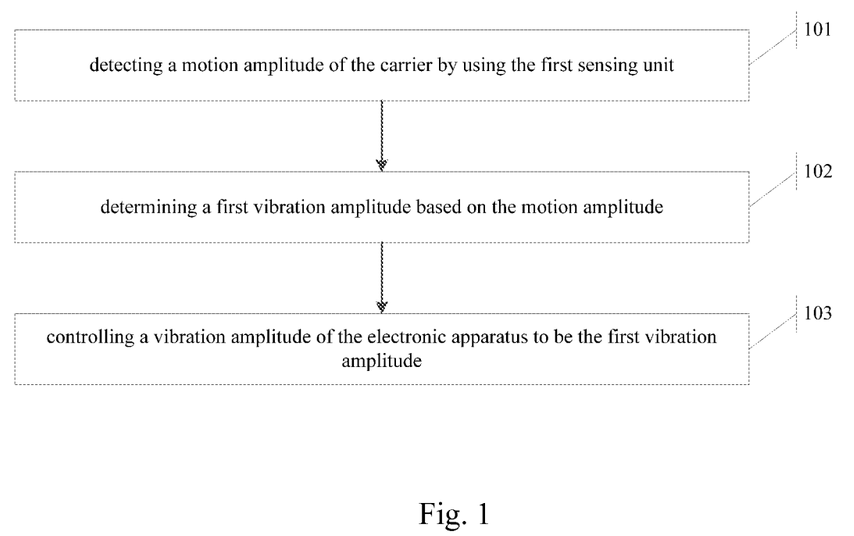
FIG. 1 is a major flowchart of an information processing method in embodiments of the present disclosure.

Referring to FIG. 1, an information processing method provided in the embodiments of the present disclosure is applicable to an electronic apparatus that has at least a first sensing unit and can be carried by a carrier. The major flows of the method are described as follows:

At Step 101, a motion amplitude of the carrier is detected by using the first sensing unit.

In the embodiment of the present disclosure, a possible application scenario is as follows: the carrier is a user, and the electronic apparatus is a mobile phone. The user carries the mobile phone, for example, the user may hold the mobile phone in a hand or put it in a bag. In the process of carrying the mobile phone, the user may be in a stationary state, for example, the user may sit, stand or lie; or the user may be in a motion state, for example, the user may be walking or running. Then, when the user is in the motion state, the electronic apparatus can detect the motion amplitude of the user through the first sensing unit.

In the embodiments of the present disclosure, when the carrier carries the electronic apparatus, the electronic apparatus can firstly detect whether or not the carrier is in the motion state, and the electronic apparatus can detect the motion amplitude of the carrier when it is determined the carrier is in the motion state.

For example, the first sensing unit can in particular be a detecting means such as an acceleration sensor or a gyroscope and so on. It can be determined whether or not the carrier is in the motion state through the detecting means such as the acceleration sensor or the gyroscope and so on in the electronic apparatus. When it is determined that the carrier is in the motion state, the motion amplitude of the carrier can be continuously determined through the detecting means such as the acceleration sensor or the gyroscope and so on.

As an example, in the embodiments of the present disclosure, the step in which the motion amplitude of the carrier is detected by using the first sensing unit comprises: judging whether or not an environmental light brightness value of an environment in which the electronic apparatus is located is lower than a preset brightness value, and detecting the motion amplitude of the carrier by using the first sensing unit when the environmental light brightness value is lower than the preset brightness value.

The process of judging whether or not an environmental light brightness value of an environment in which the electronic apparatus is located is lower than a preset brightness value can be equivalent to the process of judging whether or not the electronic apparatus is inside the bag of the user. In general, for example, the carrier is the user, when the user holds the electronic apparatus in his/her hand, the user will sense vibration of the electronic apparatus even if the user in the motion state. Thus, it can be considered that there is no need to adjust the vibration amplitude of the electronic apparatus. However, if the user puts the electronic apparatus in the bag, even if the user puts the electronic apparatus in a pocket of clothing items that the user is wearing, it may be not easy for the user to sense vibration of the electronic apparatus when the user is in the motion state. Therefore, a process of judging can be performed as follows: if the environmental light brightness value is not lower than the preset brightness value, then it is possible that the user is holding the electronic apparatus in his/her hand, and there is no need to perform a subsequent operation; if it is determined that the environmental light brightness value is lower than the preset brightness value, then it is possible that the user puts the electronic apparatus in the bag, and the motion amplitude of the user can be detected by the first sensing unit.

As an example, in the embodiments of the present disclosure, the judging whether or not an environmental light brightness value of an environment in which the electronic apparatus is located is lower than a preset brightness value may comprise: collecting environmental light information through a light sensor; and judging whether or not an environmental light intensity corresponding to the environmental light information is smaller than a light intensity threshold, wherein it is determined that the environmental light brightness value of the environment in which the electronic apparatus is located is lower than the preset brightness value when the environmental light intensity is smaller than the light intensity threshold. Here, the environmental light intensity is corresponding to the environmental light brightness value, as a specific example, it can be considered that the environmental light intensity indeed refers to the environmental light brightness value; the light intensity threshold is corresponding to the preset brightness value, as a specific example, it can be considered that the light intensity threshold indeed refers to the preset brightness value.

As an example, the electronic apparatus can have a light sensor (ALS) and collects the environmental light information through the light sensor.

As an example, if the electronic apparatus has the light sensor and a proximity sensor at the same time, then the judging whether or not an environmental light brightness value of an environment in which the electronic apparatus is located is lower than a preset brightness value may comprise: collecting environmental light information through the light sensor and collecting a first distance between an object that shades the electronic apparatus and the electronic apparatus through a proximity sensor; judging whether or not the environmental light intensity corresponding to the environmental light information is smaller than the light intensity threshold and judging whether or not the first distance is less than a preset distance; wherein it is determined that the environmental light brightness value of the environment in which the electronic apparatus is located is lower than the preset brightness value when the environmental light intensity is smaller than the light intensity threshold and the first distance is less than the preset distance.

In the embodiments of the present disclosure, when the environmental light intensity is smaller than the light intensity threshold and the first distance is less than the preset distance, it is determined that the environmental light brightness value of the environment in which the electronic apparatus is located is lower than the preset brightness value; when the environmental light intensity is smaller than the light intensity threshold and the first distance is greater than the preset distance, it is determined that the environmental light brightness value of the environment in which the electronic apparatus is located is not lower than the preset brightness value; when the environmental light intensity is larger than the light intensity threshold and the first distance is less than the preset distance, it is determined that the environmental light brightness value of the environment in which the electronic apparatus is located is not lower than the preset brightness value; when the environmental light intensity is larger than the light intensity threshold and the first distance is greater than the preset distance, it is determined that the environmental light brightness value of the environment in which the electronic apparatus is located is not lower than the preset brightness value.

In the embodiments of the present disclosure, in the case that there is a need to perform the two judging steps, for example, when it is needed to both judge whether or not the environmental light intensity is smaller than the light intensity threshold and judge whether or not the first distance is less than the preset distance, the sequence for performing the two judging steps is arbitrary.

Judging by the two judging steps enables the judging result to be more accurate. In the case of judging only by the light sensor, if the user is in the dark, even if the user holds the electronic apparatus in his/her hand, the environmental light intensity collected by the light sensor may also be smaller than the light intensity threshold; and if the process of judging the first distance is combined, then it can be accurately distinguished exactly whether the user is in the dark environment or whether the electronic apparatus is located in the bag of the user, so as to be able to better prompt the user.

As an example, in the embodiments of the present disclosure, the object that shades the electronic apparatus can be located at the front end of the electronic apparatus, i.e., the first distance collected can be a distance between the object located at the front end of the electronic apparatus and the electronic apparatus. However, the object that shades the electronic apparatus can also be located at the back end of the electronic apparatus, i.e., the first distance collected can be a distance between the object located at the back end of the electronic apparatus and the electronic apparatus.

In the embodiments of the present disclosure, if the electronic apparatus has a display unit, then the front end of the electronic apparatus can refer to an end at which the display unit is located and the back end of the electronic apparatus can refer to the other end opposite to the front end of the electronic apparatus.

Here, in the embodiments of the present disclosure, if more than one object shades the electronic apparatus, for example, there is an object 1 located at the front end of the electronic apparatus and an object 2 located at the back end of the electronic apparatus, and both of objects 1 and 2 shade the electronic apparatus, then the electronic apparatus can firstly collect a second distance between the object 1 and the electronic apparatus and a third distance between the object 2 and the electronic apparatus respectively. After having collected the second distance and the third distance, the electronic apparatus can firstly determine the length relationship between the second distance and the third distance, and determine the less one of the second distance and the third distance as the first distance, i.e., for example, if the second distance is less than the third distance, then the electronic apparatus can determine the second distance as the first distance; if the second distance is greater than the third distance, then the electronic apparatus can determine the third distance as the first distance.

At Step 102, a first vibration amplitude is determined based on the motion amplitude.

After the motion amplitude is determined, the first vibration amplitude can be determined according to the motion amplitude.

In particular, there are a variety of manners to determine the first vibration amplitude according to the motion amplitude. For example, one of the manners is as follows: there is a preset correspondence relationship table of the motion amplitude and the vibration amplitude. In the correspondence relationship table, for example, the motion amplitude can be divided into different motion amplitude ranges, and each motion amplitude range is corresponding to one vibration amplitude. For example, a possible correspondence relationship table is as shown in Table 1:

TABLE I

| Motion Amplitude Range (Unit: cm) | Vibration Amplitude (Unit: cm) |
|---|---|
| [5, 8] | 0.3 |
| [8, 11] | 0.5 |
| [11, 14] | 0.8 |

It can be seen from Table 1 that the electronic apparatus can determine that the first vibration amplitude is 0.3 cm when the motion amplitude detected falls into the range of [5, 8] cm; the electronic apparatus can determine that the first vibration amplitude is 0.5 cm when the motion amplitude detected falls into the range of [8, 11] cm; and the electronic apparatus can determine that the first vibration amplitude is 0.8 cm when the motion amplitude detected falls into the range of [11, 14] cm. Of course, the values in Table 1 are just illustrative, but do not represent the practical situation. In a practical application, the motion amplitude can be divided into different ranges according to requirements, and the vibration amplitude corresponding to each motion amplitude range can be determined according to the practical situation. Of course, the motion amplitude may not be divided into different ranges, that is, each motion amplitude value can be individually corresponding to one vibration amplitude. In this way, the result will be more accurate.

In the embodiments of the present disclosure, the first vibration amplitude is determined according to the motion amplitude, for example, another manner is to perform an operation based on the motion amplitude and a preset fixed value to obtain a result which is the first vibration amplitude. This operation may be for example any one of operations of adding, subtracting, multiplying, and dividing or may be operations of other types. For example, the preset fixed value is 0.1, and the operation manner can be a manner of multiplying. For example, the determined motion amplitude is 20 cm, then 20 is multiplied by 0.1, and the first vibration amplitude determined is 2 cm.

Of course, there can also be other determining manners for determining the first vibration amplitude according to the motion amplitude. The present disclosure does not make any limitation on the specific determining manner.

At Step 103, a vibration amplitude of the electronic apparatus is controlled to be the first vibration amplitude.

After the first vibration amplitude is determined, no other operations are performed if the vibration amplitude of the electronic apparatus is the first vibration amplitude, and the vibration amplitude of the electronic apparatus can be adjusted if the vibration amplitude of the electronic apparatus is not the first vibration amplitude, so that the electronic apparatus will vibrate with the first vibration amplitude when the electronic apparatus vibrates, so as to try to make the vibration of the electronic apparatus be easily sensed by the carrier.

As an example, the step in which the vibration amplitude of the electronic apparatus is controlled to be the first vibration amplitude may comprise: sending an instruction to a motor in the electronic apparatus and instructing the motor to control a vibration current to be a first current; wherein the vibration amplitude of the electronic apparatus is the first vibration amplitude when the vibration current of the motor is the first current.

If the electronic apparatus vibrates through the motor, larger the current generated by the motor is, greater the vibration amplitude of the electronic apparatus is. When the vibration current of the motor is the first current, the vibration amplitude of the electronic apparatus is the first vibration amplitude. Therefore, the vibration current of the motor can be controlled to be the first current. An instruction can be sent to the motor to instruct the motor to control the vibration current to be the first current. The motor will not perform any operation and can discard the instruction if the vibration current of the motor is already the first current; if the vibration current of the motor is not the first current, but is for example a second current, the motor can adjust the vibration current from the second current into the first current after having received the instruction. That is, a vibration frequency of the electronic apparatus can be changed by changing the vibration current of the motor.

As an example, in the embodiments of the present disclosure, the step in which the vibration amplitude of the electronic apparatus is controlled to be the first vibration amplitude may comprise: controlling the vibration amplitude of a vibrator in the electronic apparatus to be the first vibration amplitude.

Here, the vibrator can be a machine element in the electronic apparatus that vibrates rapidly in operation. The electronic apparatus can be made to realize vibrating through the vibrator, that is, vibration of the electronic apparatus can be implemented by the vibrator. In this case, if it is determined that the vibration amplitude of the electronic apparatus is not the first vibration amplitude, but is for example a second vibration amplitude, that is, the vibration amplitude of the vibrator in the electronic apparatus is the second vibration amplitude, then it is needed to adjust the vibration amplitude of the electronic apparatus, and adjusting the vibration amplitude can be implemented by adjusting the vibration amplitude of the vibrator in the electronic apparatus. For example, the vibration amplitude of the electronic apparatus can be adjusted from the second vibration amplitude into the first vibration amplitude by adjusting the vibration amplitude of the vibrator in the electronic apparatus from the second vibration amplitude into the first vibration amplitude.

Figure 2:
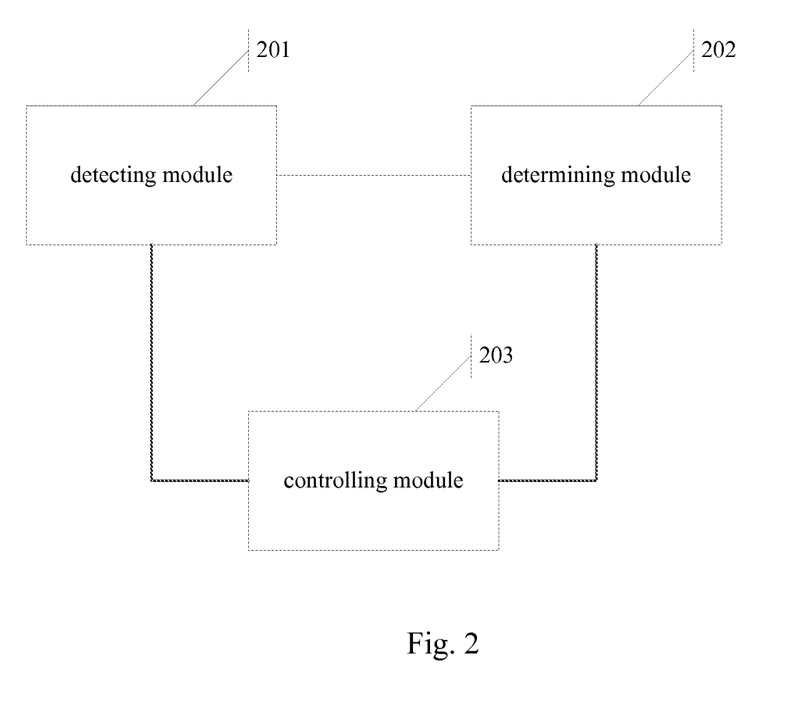
FIG. 2 is a block diagram of a major structure of an electronic apparatus in the embodiments of the present disclosure.
Figure 3:
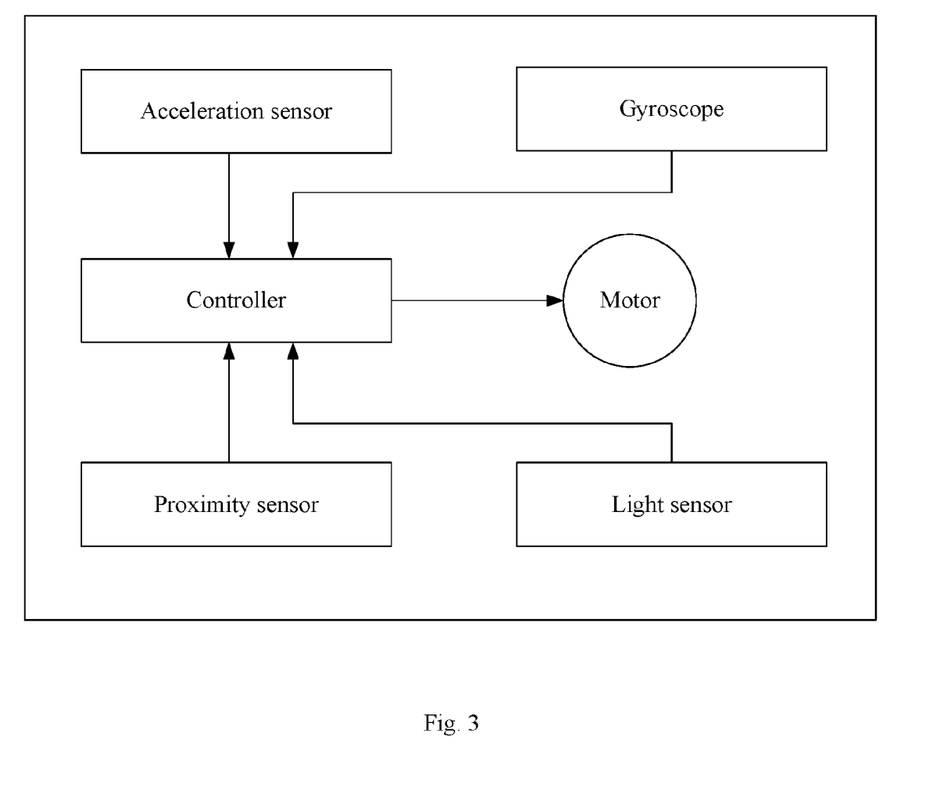
FIG. 3 is a block diagram of an electronic apparatus according to the present disclosure.

Please referring to FIG. 2, an electronic apparatus provided in the embodiments of the present invention based on the same inventive concept has at least a first sensing unit and can be carried by a carrier. The electronic apparatus comprises a detecting module 201, a determining module 202 and a controlling module 203.

The detecting module 201 can be configured to detect a motion amplitude of the carrier by using the first sensing unit.

The determining module 202 can be configured to determine a first vibration amplitude based on the motion amplitude.

The controlling module 203 can be configured to control a vibration amplitude of the electronic apparatus to be the first vibration amplitude, wherein in the case that the vibration amplitude of the electronic apparatus is the first vibration amplitude, vibration of the electronic apparatus can be sensed by the carrier when the electronic apparatus is carried by the carrier and the carrier has the motion amplitude.

As an example, in the embodiments of the present disclosure, the detecting module 201 can in particular be configured to judge whether or not an environmental light brightness value of an environment in which the electronic apparatus is located is lower than a preset brightness value and detect the motion amplitude of the carrier by using the first sensing unit when the environmental light brightness value is lower than the preset brightness value.

As an example, in the embodiments of the present disclosure, the detecting module 201 can particularly judge whether or not the environmental light brightness value of the environment in which the electronic apparatus is located is lower than a preset brightness value by collecting environmental light information through a light sensor, and judging whether or not an environmental light intensity corresponding to the environmental light information is smaller than a light intensity threshold, wherein it is determined that the environmental light brightness value of the environment in which the electronic apparatus is located is lower than the preset brightness value when the environmental light intensity is smaller than the light intensity threshold.

As an example, in the embodiments of the present disclosure, the detecting module 201 can particularly judge whether or not the environmental light brightness value of the environment in which the electronic apparatus is located is lower than a preset brightness value by collecting environmental light information through a light sensor and collecting a first distance between an object that shades the electronic apparatus and the electronic apparatus through a proximity sensor, judging whether or not the environmental light intensity corresponding to the environmental light information is smaller than the light intensity threshold, and judging whether or not the first distance is less than a preset distance, wherein it is determined that the environmental light brightness value of the environment in which the electronic apparatus is located is lower than the preset brightness value when the environmental light intensity is smaller than the light intensity threshold and the first distance is less than the preset distance.

As an example, in the embodiments of the present disclosure, the controlling module 203 can be in particular configured to send an instruction to a motor in the electronic apparatus and instruct the motor to control a vibration current to be a first current; wherein the vibration amplitude of the electronic apparatus is the first vibration amplitude when the vibration current of the motor is the first current.

As an example, in the embodiments of the present disclosure, the controlling module 203 can be in particular configured to control the vibration amplitude of a vibrator in the electronic apparatus to be the first vibration amplitude.

As an example, in the embodiments of the present disclosure, the first sensing unit is an acceleration sensor or a gyroscope.

The information processing method in the embodiments of the present disclosure can be applicable to an electronic apparatus having at least a first sensing unit. The electronic apparatus can be carried by a carrier. The method may comprise steps of: detecting a motion amplitude of the carrier by using the first sensing unit; determining a first vibration amplitude based on the motion amplitude; and controlling a vibration amplitude of the electronic apparatus to be the first vibration amplitude.

In the embodiments of the present invention, the electronic apparatus can detect the motion amplitude of the carrier, so that the vibration amplitude of the electronic apparatus can be determined according to the motion amplitude of the carrier. In this way, it can be guaranteed as much as possible that in the case that the carrier is in motion with the motion amplitude, the vibration of the electronic apparatus with the first vibration amplitude can be sensed by the carrier, such that corresponding information can be received by the carrier. If the carrier is a user, then it can be guaranteed as much as possible that the user is able to receive the information in time so as to improve user experience. On the other hand, the electronic apparatus can determine the first vibration amplitude according to the motion amplitude of the carrier, thereby generating a relatively strong prompting effect for the carrier. As such, the prompting effect of the electronic apparatus is apparently increased, and the electronic apparatus is smarter.

Those skilled in the art can clearly understand that divisions of respective functional modules as described in the above are just illustrative for sake of convenient and brief description. In the practical application, the functions can be allocated to be performed by different functional modules according to the needs, i.e., dividing the internal structure of the apparatus into different functional modules, so as to perform all or part of functions described above. The specific operating process of the system, apparatus and unit described above can make reference to corresponding processes in the method embodiment described above, and thus repeated description is omitted.

In the several embodiments provided in the present application, it shall be understood that the system, apparatus and method disclosed can be implemented by other manners. For example, the apparatus embodiment described above is just exemplary, for example, the division of the modules or units is just a logic function division, and there may be other dividing manners in the practical implementation, for example, a plurality of units or elements can be combined or can be integrated into another system, or some feature may be omitted or not performed. In addition, coupling or directly coupling or communication link displayed or discussed between the units or the modules can be through some interfaces, and an indirect coupling or communication link of apparatuses or units can be in an electrical or mechanical form or in other forms.

The units specified as separate components may be or may not be physically separated, and the means displayed as a unit may be or may not be a physical unit, that is, it may be located at a place or may be distributed over a plurality of network elements. A part or all of the units can be selected therefrom according to the actual needs to realize the purpose of the solution of the embodiments of the present disclosure.

In addition, respective functional units in respective embodiments of the present application may be integrated into one processing unit, or may exist physically separately, or two or more units may be integrated into one unit. The above integrated unit can be implemented either in a form of hardware or in a form of a software functional unit.

When being implemented in a form of a software functional unit and sold or used as an independent product, the integrated unit can be stored in a computer readable storage medium. Based on such understanding, the technical solution of the present application in substance or part thereof made contribution to the prior art or all or part of the technical solution can be reflected in a form of a software product. The computer software product is stored in a storage medium and includes several instructions to make a computer device (it may be a personal computer, a server or a network device and so on) or a processor to perform all or part of the steps of the method in the respective embodiments of the present application. The above storage medium comprises a variety of medium that can store program codes, such as USB disk, a portable hard disk, a read-only memory, a random access memory, a disk or an optical disk and so on.

In particular, computer program instructions corresponding to an information processing method in the embodiments of the present application can be stored in a storage medium such as the optical disk, the hard disk and the USB disk and so on. When the computer program instructions corresponding to the information processing method in the storage medium are read and executed by an electronic apparatus, the following steps can be performed: detecting a motion amplitude of a carrier by using a first sensing unit; determining a first vibration amplitude based on the motion amplitude; and controlling a vibration amplitude of the electronic apparatus to be the first vibration amplitude.

As an example, when the computer program instructions in the storage medium are read and executed by an electronic apparatus, in order for detecting a motion amplitude of a carrier by using a first sensing unit, the following steps can be in particular performed in the process of the computer program instructions being executed: judging whether or not an environmental light brightness value of an environment in which the electronic apparatus is located is lower than a preset brightness value; and detecting the motion amplitude of the carrier by using the first sensing unit when the environmental light brightness value is lower than the preset brightness value.

As an example, when the computer program instructions in the storage medium are read and executed by an electronic apparatus, in order for judging whether or not an environmental light brightness value of an environment in which the electronic apparatus is located is lower than a preset brightness value, the following steps can be in particular performed in the process of the computer program instructions being executed: collecting environmental light information through a light sensor; and judging whether or not an environmental light intensity corresponding to the environmental light information is smaller than a light intensity threshold; wherein it is determined that the environmental light brightness value of the environment in which the electronic apparatus is located is lower than the preset brightness value when the environmental light intensity is smaller than the light intensity threshold.

As an example, when the computer program instructions in the storage medium are read and executed by an electronic apparatus, in order for judging whether or not an environmental light brightness value of an environment in which the electronic apparatus is located is lower than a preset brightness value, the following steps can be in particular performed in the process of the computer program instructions being executed: collecting environmental light information through a light sensor and collecting a first distance between an object that shades the electronic apparatus and the electronic apparatus through a proximity sensor; judging whether or not the environmental light intensity corresponding to the environmental light information is smaller than the light intensity threshold and judging whether or not the first distance is less than a preset distance; wherein it is determined that the environmental light brightness value of the environment in which the electronic apparatus is located is lower than the preset brightness value when the environmental light intensity is smaller than the light intensity threshold and the first distance is less than the preset distance.

As an example, when the computer program instructions in the storage medium are read and executed by an electronic apparatus, in order for controlling a vibration amplitude of the electronic apparatus to be the first vibration amplitude, the following steps can be in particular performed in the process of the computer program instructions being executed: sending an instruction to a motor in the electronic apparatus and instructing the motor to control a vibration current to be a first current; wherein the vibration amplitude of the electronic apparatus is the first vibration amplitude when the vibration current of the motor is the first current.

As an example, when the computer program instructions in the storage medium are read and executed by an electronic apparatus, in order for controlling a vibration amplitude of the electronic apparatus to be the first vibration amplitude, the following step can be in particular performed in the process of the computer program instructions being executed: controlling the vibration amplitude of a vibrator in the electronic apparatus to be the first vibration amplitude.

In the embodiments of the present invention, the electronic apparatus can detect the motion amplitude of the carrier such that the vibration amplitude of the electronic apparatus can be determined according to the motion amplitude of the carrier. In this way, it can be guaranteed as much as possible that: in the case that the carrier is in motion with the motion amplitude, the vibration of the electronic apparatus with the first vibration amplitude can be sensed by the carrier, such that corresponding information can be received by the carrier. If the carrier is a user, it can be guaranteed as much as possible that the user is able to receive the information in time so as to improve user experience. On the other hand, the electronic apparatus can determine the first vibration amplitude according to the motion amplitude of the carrier, thereby generating a relatively strong prompting effect for the carrier. As such, the prompting effect of the electronic apparatus is apparently increased, and the electronic apparatus is smarter.

The above embodiments are just used for describing the technical solutions of the present application in detail, but the description of the above embodiment is only used for assisting in understanding the method of the present disclosure and the core concept thereof and shall not be understood as a limitation to the present disclosure. Alternations or replacements easily conceivable for those skilled in the art within the technical scope disclosed present application shall be deemed as falling into the protection scope of the present disclosure.

The invention claimed is:

1. A method of operating a portable electronic apparatus comprising:
   determining whether an environmental light brightness value of an environment in which the portable electronic apparatus is located is lower than a preset brightness value if the environmental light brightness value is lower than the preset brightness value, determining the user is not holding the electronic apparatus in a hand;
   detecting a motion amplitude of the portable electronic apparatus; and
   vibrating the portable electronic apparatus by a vibrating amplitude that is based upon the detected motion amplitude of the portable electronic apparatus,
   wherein, the vibrating amplitude is determined by an arithmetic operation based on the motion amplitude and a preset fixed value, the arithmetic operation is selected from the group consisting of adding, subtracting, multiplying, and dividing.

2. The method according to claim 1, wherein the vibrating the portable electronic apparatus by a vibrating amplitude comprises controlling a motor in a vibrator, in order to vibrate the vibrator by the vibrating amplitude that is based upon the detected motion amplitude of the portable electronic apparatus.

3. The method according to claim 1, wherein the vibrating the portable electronic apparatus by a vibrating amplitude comprises vibrating a vibrator within the portable electronic apparatus by a first vibration amplitude.

4. The method according to claim 1, wherein an acceleration sensor or a gyroscope in the portable electronic device detects the motion amplitude of the portable electronic apparatus.

5. The method according to claim 1, wherein the determining whether or not an environmental light brightness value of an environment in which the electronic apparatus is located is lower than a preset brightness value comprises:
   collecting environmental light information through a light sensor; and
   judging whether or not an environmental light intensity corresponding to the environmental light information is smaller than a light intensity threshold; wherein it is determined that the environmental light brightness value of the environment in which the electronic apparatus is located is lower than the preset brightness value when the environmental light intensity is smaller than the light intensity threshold.

6. The method according to claim 1, wherein the determining whether or not an environmental light brightness value of an environment in which the portable electronic apparatus is located is lower than a preset brightness value comprises:
   collecting environmental light information through a light sensor and collecting a first distance between the portable electronic apparatus and an object adjacent to the portable electronic apparatus through a proximity sensor;
   determining that the environmental light brightness value of the environment in which the portable electronic apparatus is located is lower than the preset brightness value if the environmental light intensity is smaller than the light intensity threshold and the first distance is less than a preset distance.

7. A portable electronic apparatus comprising:
   a light sensor for collecting environmental light information;
   a proximity sensor for collecting a first distance between the portable electronic apparatus and an object adjacent to the portable electronic apparatus, wherein the object differs from a human body;
   a vibrator for vibrating the portable electronic apparatus;
   a detector configured to determine whether an environmental light brightness value of the environment in which the portable electronic apparatus is located is lower than a preset brightness value if the environmental light brightness value is lower than the preset brightness value, determine the user is not holding the electronic apparatus in a hand, detect a motion amplitude of the portable electronic apparatus; and
   a controller configured to control the vibrator in order to adjust a vibration amplitude of the vibrator based upon the motion amplitude of the portable electronic apparatus as detected by the detector,
   wherein, the vibrating amplitude is determined by an arithmetic operation based on the motion amplitude and a preset fixed value, the arithmetic operation is selected from the group consisting of adding, subtracting, multiplying, and dividing.

8. The portable electronic apparatus according to claim 7, wherein the controller is configured to control a motor in the vibrator so that the vibration amplitude of the vibrator is based upon the detected motion amplitude of the portable electronic apparatus.

9. The portable electronic apparatus according to claim 7, wherein the controller is configured to control the vibration amplitude of the vibrator by a first vibration amplitude.

10. The portable electronic apparatus according to claim 7, wherein the detector includes an acceleration sensor or a gyroscope.

11. The portable electronic apparatus according to claim 7, wherein the detector is configured to determine whether or not the environmental light brightness value of the environment in which the portable electronic apparatus is located is lower than the preset brightness value by:
    collecting environmental light information through the light sensor; and
    determining that the environmental light brightness value of the environment in which the portable electronic apparatus is located is lower than the preset brightness value if the environmental light intensity is smaller than a light intensity threshold.

12. The portable electronic apparatus according to claim 7, wherein the detector is configured to determine whether or not the environmental light brightness value of the environment in which the portable electronic apparatus is located is lower than the preset brightness value by:
    collecting environmental light information through the light sensor and collecting a first distance between the portable electronic apparatus and an object adjacent to the portable electronic apparatus through a proximity sensor;
    determining that the environmental light brightness value of the environment in which the portable electronic apparatus is located is lower than the preset brightness value if the environmental light intensity is smaller than the light intensity threshold and the first distance is less than a preset distance.

13. A non-transitory computer readable storage medium with computer program instructions recorded thereon, wherein a method of operating a portable electronic apparatus is performed when the computer program instructions are executed, the method comprising:
 determining whether an environmental light brightness value of the environment in which the portable electronic apparatus is located is lower than the preset brightness value if the environmental light brightness value is lower than the preset brightness value, determining the user is not holding the electronic apparatus in a hand;
 detecting a motion amplitude of the portable electronic device; and
 vibrating the portable electronic apparatus by a vibration amplitude that is based upon the detected motion amplitude of the portable electronic apparatus,
 wherein, the vibrating amplitude is determined by an arithmetic operation based on the motion amplitude and a preset fixed value, the arithmetic operation is selected from the group consisting of adding, subtracting, multiplying, and dividing.

14. The non-transitory computer readable storage medium of claim 13, wherein the vibrating the portable electronic apparatus by the vibration amplitude comprises controlling a motor in a vibrator within the portable electronic apparatus in order to vibrate the vibrator by the vibrating amplitude that is based upon the detected motion amplitude of the portable electronic apparatus.

15. The non-transitory computer readable storage medium of claim 13, wherein the vibrating the portable electronic apparatus comprises vibrating a vibrator within the portable electronic apparatus by a first vibration amplitude.

16. The non-transitory computer readable storage medium of claim 13, wherein the determining whether or not an environmental light brightness value of an environment in which the portable electronic apparatus is located is lower than a preset brightness value comprises:
 collecting environmental light information through a light sensor; and
 determining that the environmental light brightness value of the environment in which the portable electronic apparatus is located is lower than the preset brightness value if the environmental light intensity is smaller than a light intensity threshold.

17. The non-transitory computer readable storage medium of claim 13, wherein the determining whether or not an environmental light brightness value of an environment in which the portable electronic apparatus is located is lower than a preset brightness value comprises:
 collecting environmental light information through a light sensor and collecting a first distance between the portable electronic apparatus and an object adjacent to the portable electronic apparatus through a proximity sensor;
 determining that the environmental light brightness value of the environment in which the portable electronic apparatus is located is lower than the preset brightness value when the environmental light intensity is smaller than the light intensity threshold and the first distance is less than a preset distance.

* * * * *